United States Patent
Chao et al.

(10) Patent No.: US 12,449,717 B2
(45) Date of Patent: Oct. 21, 2025

(54) OPTICAL ELEMENT DRIVING MECHANISM

(71) Applicant: TDK TAIWAN CORP., Taoyuan (TW)

(72) Inventors: Chen-Hung Chao, Taoyuan (TW);
Po-Xiang Zhuang, Taoyuan (TW);
Sin-Jhong Song, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 180 days.

(21) Appl. No.: 18/350,879

(22) Filed: Jul. 12, 2023

(65) Prior Publication Data

US 2024/0019763 A1 Jan. 18, 2024

Related U.S. Application Data

(60) Provisional application No. 63/388,793, filed on Jul. 13, 2022.

(51) Int. Cl.
| | |
|---|---|
| *G03B 9/06* | (2021.01) |
| *G02B 7/02* | (2021.01) |
| *G02B 27/64* | (2006.01) |
| *G03B 5/00* | (2021.01) |
| *G03B 17/12* | (2021.01) |
| *G03B 30/00* | (2021.01) |
| *H02K 41/035* | (2006.01) |
| *G02B 27/01* | (2006.01) |

(52) U.S. Cl.
CPC .............. *G03B 9/06* (2013.01); *G02B 7/02* (2013.01); *G02B 27/646* (2013.01); *G03B 5/00* (2013.01); *G03B 17/12* (2013.01); *G03B 30/00* (2021.01); *H02K 41/0354* (2013.01); *G02B 2027/0159* (2013.01); *G03B 2205/0069* (2013.01)

(58) Field of Classification Search
CPC .... G02B 27/646; G02B 7/08–07; G03B 5/00; G03B 3/10; G03B 30/00
See application file for complete search history.

(56) References Cited

U.S. PATENT DOCUMENTS

| | | | | |
|---|---|---|---|---|
| 4,348,092 A | * | 9/1982 | Hirohata | G03B 9/22 396/500 |
| 8,137,012 B2 | * | 3/2012 | Huang | G03B 9/08 396/463 |
| 8,360,665 B2 | * | 1/2013 | Han | G03B 9/14 310/12.24 |
| 2019/0068042 A1 | * | 2/2019 | Kimura | H02K 41/0354 |

FOREIGN PATENT DOCUMENTS

| | | |
|---|---|---|
| CN | 216718788 U | 6/2022 |
| JP | 2001350172 A * | 12/2001 |

OTHER PUBLICATIONS

Office Action dated Nov. 28, 2023 issued in corresponding Chinese Application No. 202321601675.2 (1 Page).

* cited by examiner

*Primary Examiner* — Leon W Rhodes, Jr.
(74) *Attorney, Agent, or Firm* — MUNCY, GEISSLER, OLDS & LOWE, P.C.

(57) ABSTRACT

An optical element driving mechanism is provided. The optical element driving mechanism includes a movable part, a fixed part, and a driving assembly. The movable part connects an optical element. The movable part moves relative to the fixed part. The driving assembly drives the movable part to move relative to the fixed part. The driving assembly includes a first magnetic element and a coil.

18 Claims, 6 Drawing Sheets

OPTICAL ELEMENT DRIVING MECHANISM

CROSS REFERENCE TO RELATED APPLICATIONS

This application claims the benefit of U.S. Provisional Application No. 63/388,793, filed Jul. 13, 2022, the entirety of which is incorporated by reference herein.

BACKGROUND OF THE INVENTION

Field of the Invention

The present invention relates to an optical element driving mechanism, and, in particular, to an optical element driving mechanism that drives a movable part to move.

Description of the Related Art

Thanks to developments in science and technology, many electronic devices (such as notebook computers, smartphones, and digital cameras) now have the function of taking photos and recording videos. The use of these electronic devices is becoming more and more common. Apart from the development of more stable and better optical quality, the design is also moving towards a more convenient and thinner side, so as to provide users with more choices. The design of electronic devices is constantly developing towards miniaturization, so that the size of various components and structures used in optical modules such as cameras must also be continuously reduced. In view of this, how to design a miniaturized driving mechanism has become an important issue.

BRIEF SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate parts of the entire specification of this disclosure, any or all drawings, and each claim.

According to certain aspects of the present disclosure, an optical element driving mechanism is provided. The optical element driving mechanism includes a movable part, a fixed part, and a driving assembly. The movable part connects an optical element. The movable part moves relative to the fixed part. The driving assembly drives the movable part to move relative to the fixed part. The driving assembly includes a first magnetic element and a coil.

In some embodiments, the first magnetic element has a polygonal structure, and a first section of the coil corresponds to the first magnetic element.

In some embodiments, when viewed along a winding axis of the coil, a first side of the first magnetic element is neither parallel nor perpendicular to the first section of the coil.

In some embodiments, when viewed along the winding axis of the coil, a second side of the first magnetic element is neither parallel nor perpendicular to the first section of the coil, and the first side is perpendicular to the second side.

In some embodiments, the driving assembly further includes a second magnetic element. The second magnetic element has a polygonal structure, corresponding to a second section of the coil.

In some embodiments, when viewed along the winding axis of the coil, a third side of the second magnetic element is neither parallel nor perpendicular to the second section of the coil.

In some embodiments, when viewed along the winding axis of the coil, a fourth side of the second magnetic element is neither parallel nor perpendicular to the second section of the coil, and the third side is perpendicular to the fourth side.

In some embodiments, there is a gap between the first magnetic element and the second magnetic element, and the planes of any two sides of the gap are not parallel.

In some embodiments, the coil moves relative to the first magnetic element and the second magnetic element.

In some embodiments, the driving assembly further includes a first magnetic permeable element corresponding to the first magnetic element.

In some embodiments, the first magnetic permeable element has a first disposing part and a first sidewall.

In some embodiments, the first magnetic disposing part covers the first magnetic element.

In some embodiments, the first magnetic permeable element is integrally formed, encasing the first magnetic element and the second magnetic element.

In some embodiments, when viewed along the winding axis of the coil, the first magnetic element and the second magnetic element are smaller than the first magnetic permeable element.

In some embodiments, the driving assembly further includes a second magnetic permeable element corresponding to the first magnetic element. The second magnetic permeable element may move relative to the first magnetic permeable element.

In some embodiments, when viewed along the winding axis of the coil, the area of the second magnetic permeable element is smaller than the area of the first magnetic permeable element.

In some embodiments, the length of the second magnetic permeable element is smaller than the sum of the length of the first magnetic element and the second magnetic element.

In some embodiments, the movable part further includes a groove. The second magnetic permeable element is positioned within the groove of the movable part.

In some embodiments, wherein when viewed along the winding axis of the coil, the second magnetic permeable element, the groove, the coil, and the first magnetic element and the second magnetic element are arranged sequentially, and the coil is positioned corresponding to the groove.

In some embodiments, the movable part includes a plurality of supporting pillars positioned on both sides of the coil.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION OF THE INVENTION

Figure 1:
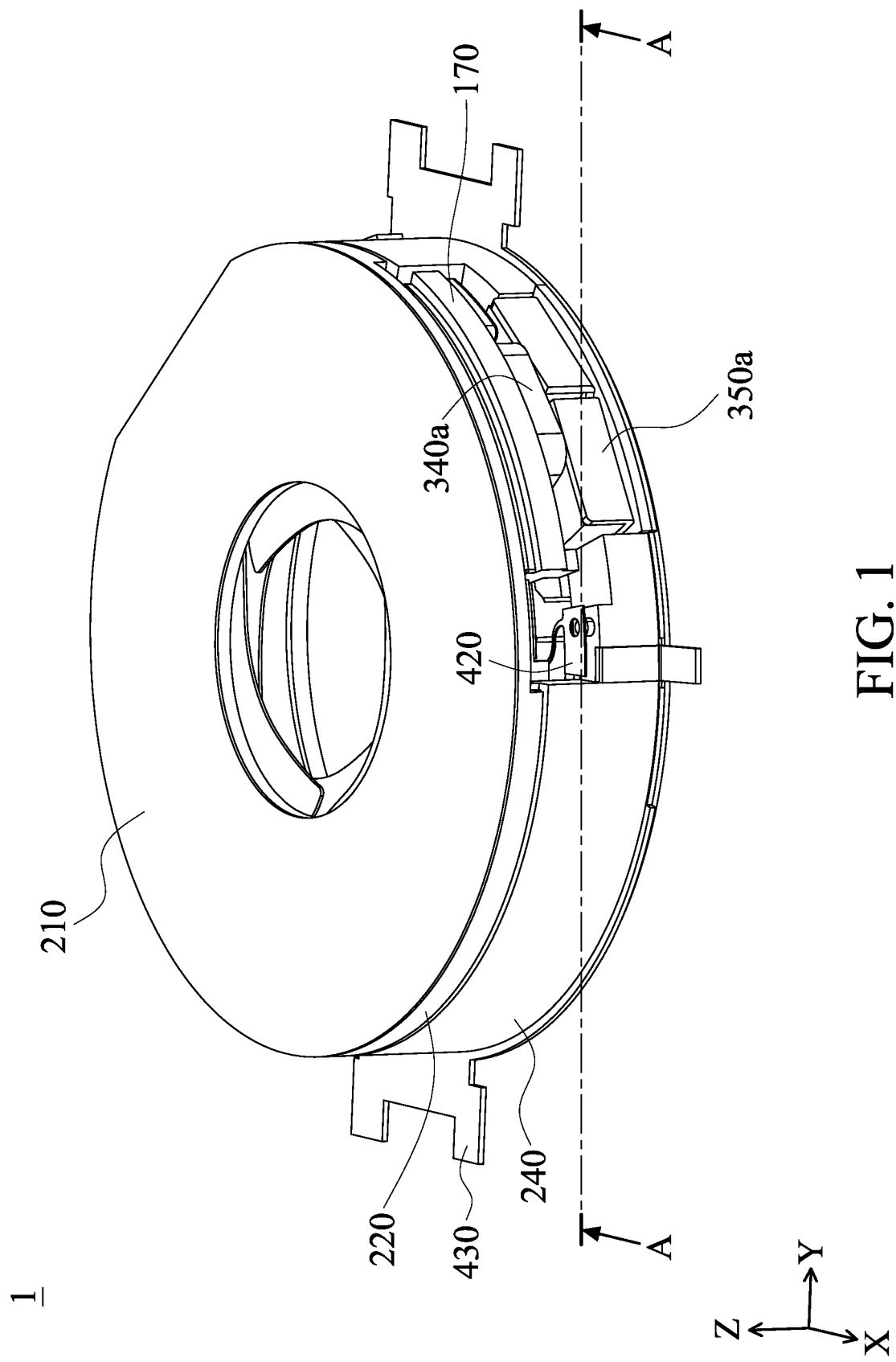
FIG. 1 is a front perspective view of an example optical element driving mechanism, according to certain aspects of the present disclosure.

Various embodiments are described with reference to the attached FIGS., where like reference numerals are used throughout the FIGS. to designate similar or equivalent elements. The FIGS. are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2:
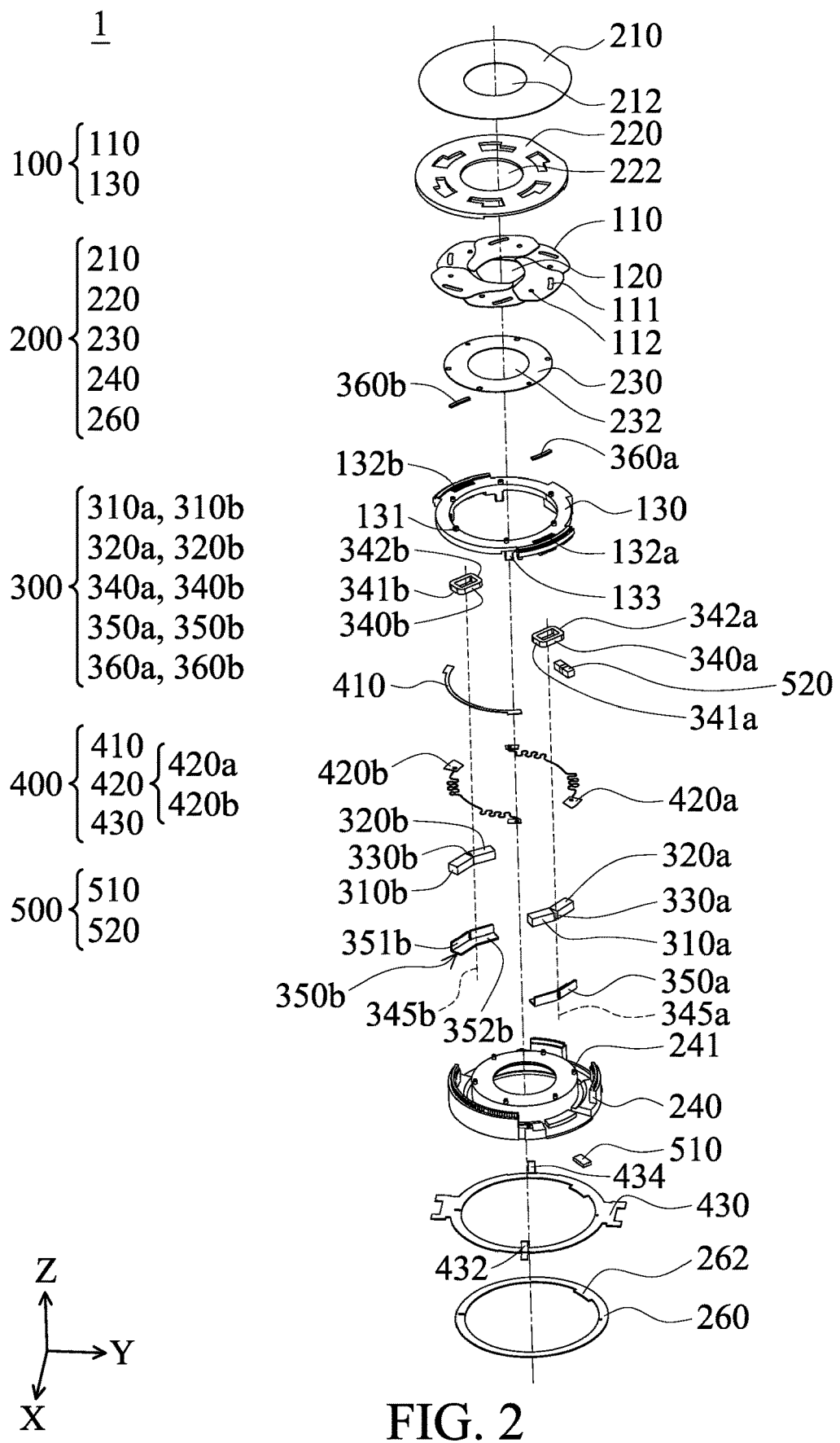
FIG. 2 is an exploded perspective view of the optical element drive mechanism of FIG. 1, according to certain aspects of the present disclosure.

First, please refer to FIG. 1 and FIG. 2 together. FIG. 1 is a front perspective view of an example optical element driving mechanism 1, according to certain aspects of the present disclosure. The optical element driving mechanism 1 connects to an optical element (not shown in the FIGS.). FIG. 2 is an exploded perspective view of the optical element driving mechanism 1, according to certain aspects of the present disclosure. The optical element driving mechanism 1 includes a movable part 100, a fixed part 200, a driving assembly 300, a circuit assembly 400, and a position sensing assembly 500. The movable part 100 connects the optical element, and the movable part 100 may move relative to the fixed part 200, and the driving assembly 300 drives the movable part 100 to move relative to the fixed part 200. The circuit assembly 400 is electrically connected to the driving assembly 300, and the position sensing assembly 500 senses the movement of the movable part 100 relative to the fixed part 200

Figure 3:
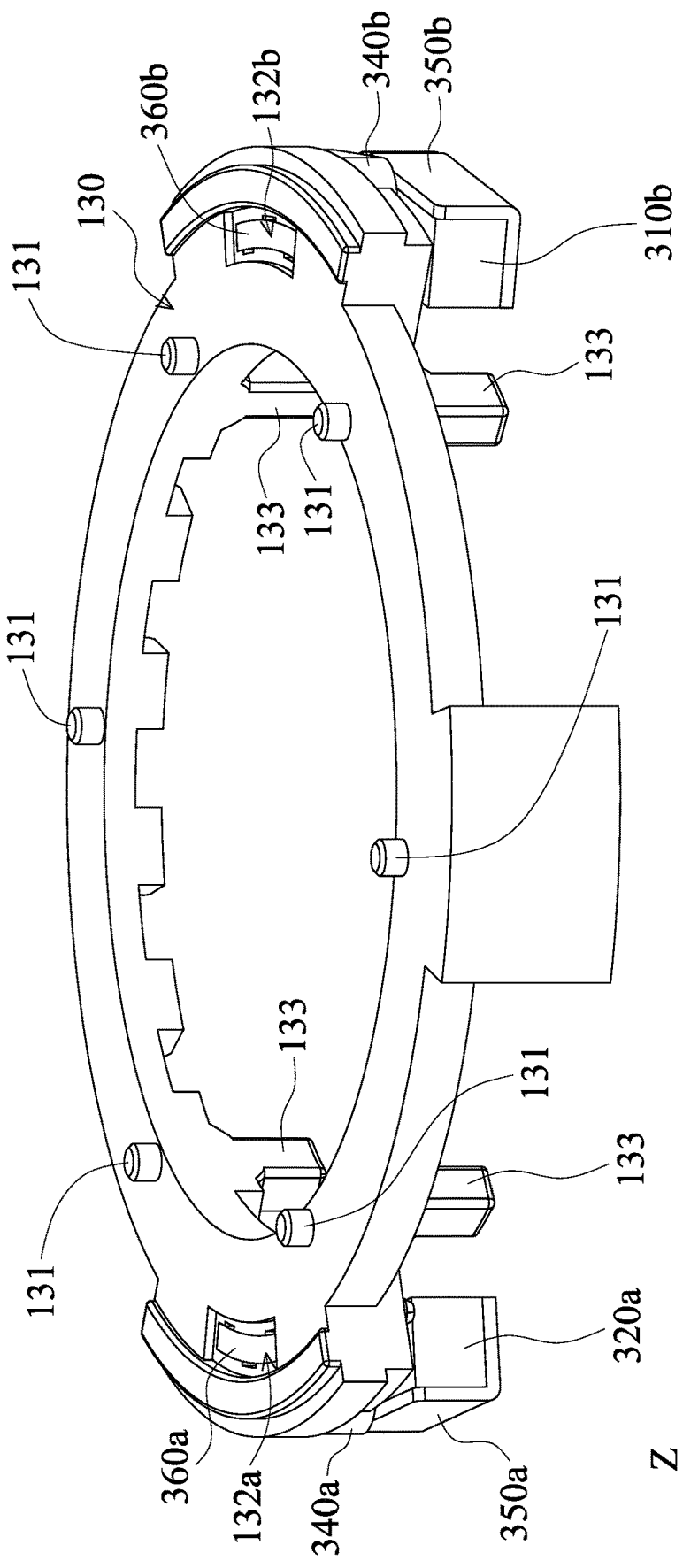
FIG. 3 is a front perspective view of a carrier and a driving assembly of the optical element driving mechanism of FIG. 1, according to certain aspects of the present disclosure.

The movable part 100 includes several blades 110 and a carrier 130. Each blade 110 respectively includes an elongated hole 111 and a small hole 112. A first opening 120 is formed in the center of the blades 110. The carrier 130 includes several protrusions 131, two grooves 132*a*, 132*b*, and several supporting pillars 133. The grooves 132*a*, 132*b* are located on the opposite sides of the carrier 130. A second magnetic permeable element 360*a* of the driving assembly 300 is disposed in the groove 132*a*, and a support pillar 133 (which is illustrated in FIG. 3) is disposed on both sides of the groove 132*a*. A second magnetic permeable element 360*b* of the driving assembly 300 is disposed in the groove 132*b*, and a support pillar 133 is disposed on both sides of the groove 132*b*. The blade 110 is movably disposed on the carrier 130 by passing the protrusions 131 of the carrier 130 through the elongated hole 111 of the blade 110. The driving assembly 300 drives the carrier 130 to rotate relative to the fixed part 200, then drives the blade 110 to move, and then changes the size of the first opening 120.

The fixed part 200 includes a first light shielding element 210, a frame 220, a second light shielding element 230, a bottom 240, and a protection element 260. The first light shielding element 210 includes a second opening 212, the frame 220 includes a third opening 222, the second light shielding element 230 includes a fourth opening 232. An incident light may pass through the second opening 212, the third opening 222, the first opening 120 and the fourth opening 232 sequentially and then enter the optical element driving mechanism 1. The size of the second opening 212 is about the same as the size of the third opening 222, the size of the fourth opening 232 is smaller than the size of the second opening 212 and the third opening 222, and the size of the first opening 120 is smaller than the size of the fourth opening 232. The bottom 240 includes several protrusions 241, and the blade 110 is movably connected to the carrier 130 and the bottom 240 by passing the protrusions 241 of the bottom 240 through the small holes 112 of the blade 110. The protection element 260 has a metal material, and the metal material is not magnetic permeable.

The driving assembly 300 includes a first magnetic element 310a, a second magnetic element 320a, a third magnetic element 310b, a fourth magnetic element 320b, two coils 340a, 340b, two first magnetic permeable elements 350a, 350b, and two second magnetic permeable elements 360a, 360b. A gap 330a is between the first magnetic element 310a and the second magnetic element 320a, and a gap 330b is between the third magnetic element 310b and the fourth magnetic element 320b.

Please refer to FIG. 3, which is a front perspective view of the carrier 130 and the driving assembly 300, according to certain aspects of the present disclosure. The coils 340a, 340b are structurally disposed corresponding to the grooves 132a, 132b. Specifically, the coils 340a, 340b are disposed on the carrier 130. The coil 340a is disposed on the opposite side of the carrier 130 to the groove 132a, and the coil 340b is disposed on the opposite side of the carrier 130 to the groove 132b. That is, the carrier 130 is between the groove 132a and the coil 340a, and between the groove 132b and the coil 340b. The grooves 132a, 132b and the coils 340a, 340b are arranged along the Z-axis. The configuration of the arrangement along the Z-axis may save space and achieve miniaturization of the mechanism.

Figure 4A:
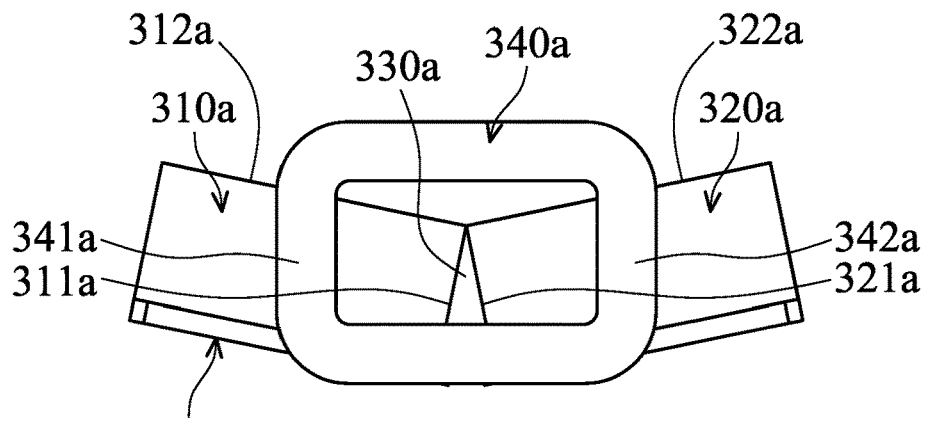
FIG. 4A is a top view of a first magnetic element, a second magnetic element, a coil, and a first magnetic permeable element of the optical element driving mechanism of FIG. 1, according to certain aspects of the present disclosure.

Please refer to FIG. 4A, which is a top view of the first magnetic element 310a, the second magnetic element 320a, the coil 340a, and the first magnetic permeable element 350a, according to certain aspects of the present disclosure. The planes of any two sides of gap 330a are non-parallel. Which means the surface of the first magnetic element 310a that is facing the gap and the surface of the second magnetic element 320a that is facing the gap are not parallel to each other. Similar to gap 330a, the planes of any two sides of gap 330b (which is illustrated in FIG. 2) are non-parallel. Which means the surface of the third magnetic element 310a that is facing the gap and the surface of the fourth magnetic element 320a that is facing the gap are not parallel to each other. The first magnetic element 310a has a polygonal structure. A first section 341a of the coil 340a corresponds to the first magnetic element 310a. The position of the first section 341a corresponds to the first magnetic element 310a, and is located above the first magnetic element 310a. When viewed along a winding axis 345a of the coil 340a (which is illustrated in FIG. 2), a first side 311a of the first magnetic element 310a and a first section 341a of the coil 340a are neither parallel nor perpendicular to each other. When viewed along the winding axis 345a of the coil 340a, the second side 312a of the first magnetic element 310a and the first section 341a of the coil 340a are neither parallel nor perpendicular to each other. The first side 311a and the second side 312a are perpendicular to each other.

The second magnetic element 320a has a polygonal structure. A second section 342a of the coil 340a corresponds to the second magnetic element 320a. The position of the second section 342a corresponds to the second magnetic element 320a, and is located above the second magnetic element 320a. When viewed along the winding axis 345a of the coil 340a (which is illustrated FIG. 2), a third side 321a of the second magnetic element 320a and the second section 342a of the coil 340a are neither parallel nor perpendicular to each other. When viewed along the winding axis 345a of the coil 340a, a fourth side 322a of the second magnetic element 320a and the second section 342a of the coil 340a are neither parallel nor perpendicular to each other. The third side 321a and the fourth side 322a are perpendicular to each other.

By the electromagnetic driving force generated between the first magnetic element 310a, the second magnetic element 320a, and the coil 340a, the coil 340a moves relative to the first magnetic element 310a and the second magnetic element 320a, driving the carrier 130 to rotate with the Z-axis (which is illustrated FIG. 2) as the center of rotation. The carrier 130 rotates and drives the blades 110 to move by the protrusions 131 to change the size of the first opening 120.

Figure 4B:
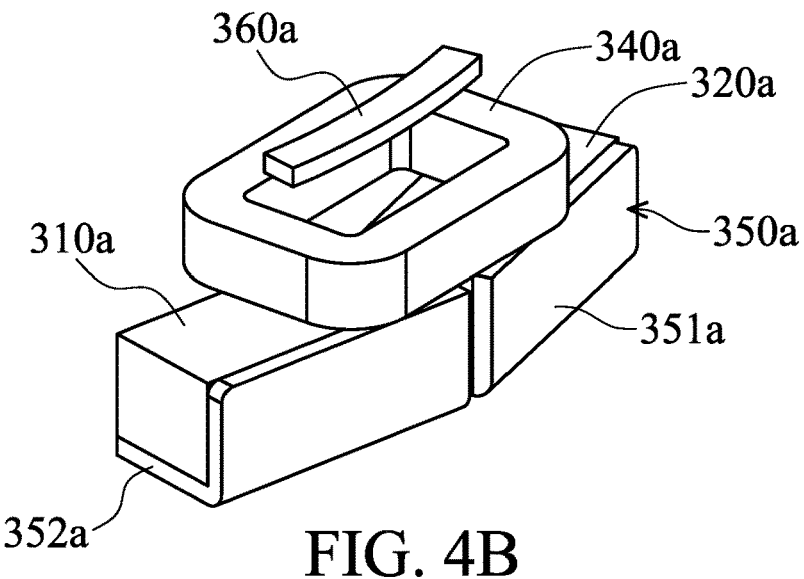
FIG. 4B is a perspective view of the first magnetic element, the second magnetic element, the coil, the first magnetic permeable element, and a second magnetic permeable element of the optical element driving mechanism of FIG. 1, according to certain aspects of the present disclosure.

Please refer to FIG. 4B, which is a perspective view of the first magnetic element 310a, the second magnetic element 320a, the coil 340a, the first magnetic permeable element 350a, and the second magnetic permeable element 360a, according to certain aspects of the present disclosure. The second magnetic permeable element 360a is disposed in the groove 132a of the carrier 130 (please refer to FIG. 3, as the carrier 130 is not shown here in FIG. 4B for illustrative reasons). The first magnetic permeable element 350a corresponds to the first magnetic element 310a and the second magnetic element 320a. The position of the first magnetic permeable element 350a corresponds to the first magnetic element 310a and the second magnetic element 320a, and is located under the first magnetic element 310a and the second magnetic element 320a. The first magnetic permeability element 350a has a first sidewall 351a and a first disposing part 352a. The first magnetic permeable element 350a is integrally formed (which is illustrated in FIG. 2), and the first sidewall 351a and the first disposing part 352a are fixedly connected. When viewed along the winding axis 345a of the coil 340a, the sum of the bottom areas of the first magnetic element 310a and the second magnetic element 320a is smaller than the bottom area of the first magnetic permeable element 350a. The first magnetic permeable element 350a encases the first magnetic element 310a and the second magnetic element 320a. In detail, the first sidewall 351a of the first magnetic permeable element 350a encases the surfaces of the first magnetic element 310a and the second magnetic element 320a that are facing away from the center of the carrier 130. The first disposing part 352a of the first magnetic permeable element 350a encases surfaces of the first magnetic element 310a and the second magnetic element 320a facing away from the coil 340a. Therefore, the first disposing part 352a covers surfaces of the first magnetic element 310a and the second magnetic element 320a facing away from the coil 340a. Covering by the first disposing part 352a may block the magnetic interference and avoid affecting the electromagnetic driving force generated between the first magnetic element 310a, the second magnetic element 320a, and the coil 340a.

Figure 4C:
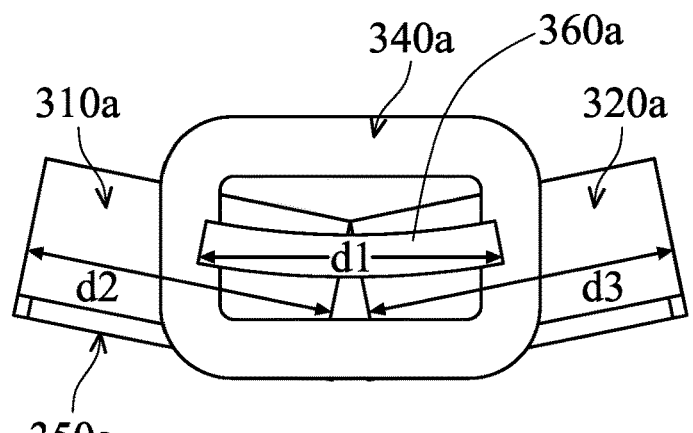
FIG. 4C is a top view of the first magnetic element, the second magnetic element, the coil, the first magnetic permeable element, and the second magnetic permeable element of the optical element driving mechanism of FIG. 1, according to certain aspects of the present disclosure.

The second magnetic permeable element 360a is disposed in the groove 132a of the carrier 130 (which is illustrated in FIG. 3), corresponding to the first magnetic element 310a and the second magnetic element 320a. The position of the second magnetic permeable element 360a corresponds to the first magnetic element 310a and the second magnetic element 320a, and is located above the first magnetic element 310a and the second magnetic element 320a. When viewed along the winding axis 345a of the coil 340a, the second magnetic permeable element 360a, the groove 132a, the coil 340a, and the first magnetic element 310a and the second magnetic element 320a are arranged sequentially (which is illustrated in FIG. 3). The second magnetic permeable element 360a may move relative to the first magnetic permeable element 350a. Please refer to FIG. 4C, which is a top view of the first magnetic element 310a, the second magnetic element 320a, the coil 340a, the first magnetic permeable element 350a, and the second magnetic permeable element 360a, according to certain aspects of the present disclosure. When viewed along the winding axis 345a of the coil 340a (which is illustrated in FIG. 2), the area of the second magnetic permeable element 360a is smaller than the area of the first magnetic permeable element 350a. The length d1 of the second magnetic permeable element 360a is smaller than the sum of the length d2 of the first magnetic element 310a and the length d3 of the second magnetic element 320a. The second magnetic permeable element 360a is arc-shaped, while in other embodiments, the second magnetic permeable element 360a may also come in other shapes.

Figure 5:
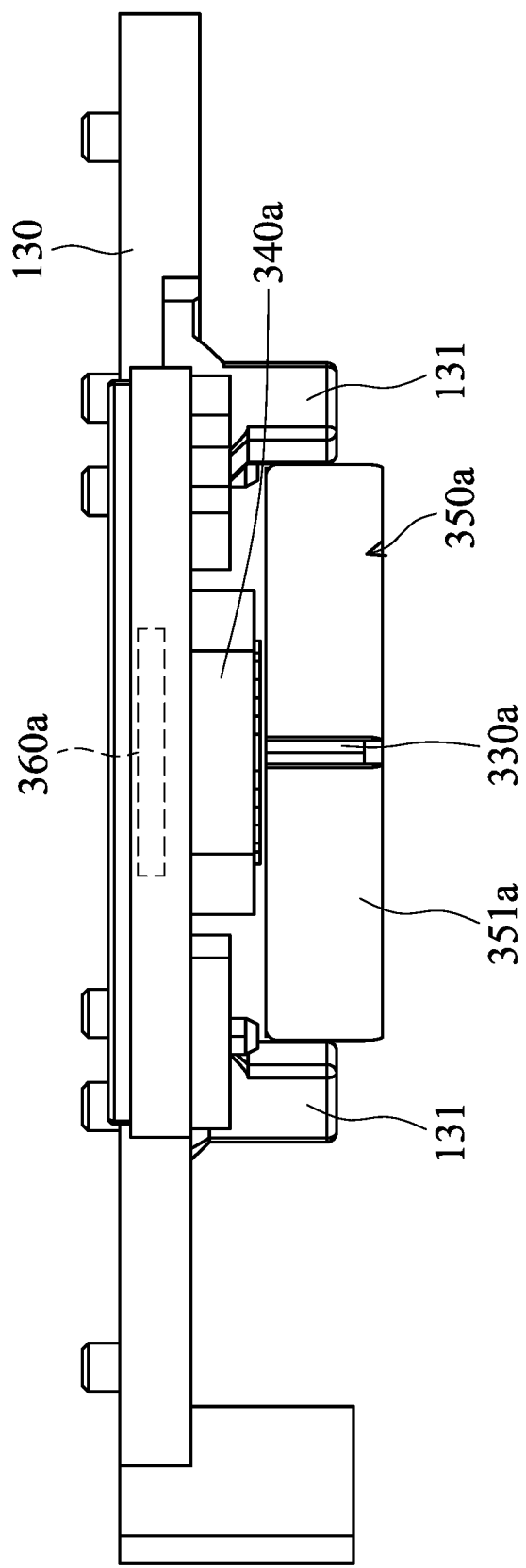
FIG. 5 is a side view of a movable part and the driving assembly of the optical element driving mechanism of FIG. 1, according to certain aspects of the present disclosure.

Next, please refer to FIG. 5. The second magnetic permeable element 360a is attracted by the magnetic force of the first magnetic element 310a and the second magnetic element 320a and to the carrier 130 and the coil 340a. By the attraction of the magnetic force, the driving assembly 300 and the movable part 100 is a stable structure.

The third magnetic element 310b and the fourth magnetic element 320b are similar to the first magnetic element 310a and the second magnetic element 320a, and the coil 340b is similar to the coil 340a. The third magnetic element 310b and the fourth magnetic element 320b have a polygonal structure, and a first section 341b of the coil 340b corresponds to the third magnetic element 310b. The position of the first section 341b corresponds to the third magnetic element 310b, and is located above the third magnetic element 310b. When viewed along a winding axis 345b of the coil 340b (which is illustrated in FIG. 2), a first side of the third magnetic element 310b and the first section 341b of the coil 340b are neither parallel nor perpendicular to each other. When viewed along the winding axis 345b of the coil 340b, a second side of the third magnetic element 310b and the first section 341b of the coil 340b are neither parallel nor perpendicular to each other. The first side and the second side of the third magnetic element 310b are perpendicular to each other.

The fourth magnetic element 320b has a polygonal structure. A second section 342b of the coil 340b corresponds to the fourth magnetic element 320b. The position of the second section 342b corresponds to the fourth magnetic element 320b, and is located above the fourth magnetic element 320b. When viewed along the winding axis 345b of the coil 340b (which is illustrated in FIG. 2), a third side of the fourth magnetic element 320b and the second section 342b of the coil 340b are neither parallel nor perpendicular to each other. When viewed along the winding axis 345b of the coil 340b, a fourth side of the fourth magnetic element 320b and the second section 342b of the coil 340b are neither parallel nor perpendicular to each other. The third side is perpendicular to the fourth side.

By the electromagnetic driving force generated between the third magnetic element 310b, the fourth magnetic element 320b, and the coil 340b, the coil 340b moves relative to the third magnetic element 310b and the fourth magnetic element 320b, driving the carrier 130 to rotate with the Z-axis as the center of rotation. The carrier 130 rotates and drives the blades 110 to move by the protrusions 131 to change the size of the first opening 120.

The first magnetic permeable element 350b is similar to the first magnetic permeable element 350a, and the second magnetic permeable element 360b is similar to the second magnetic permeable element 360a. The first magnetic permeable element 350b corresponds to the third magnetic element 310b and the fourth magnetic element 320b. The position of the first magnetic permeable element 350b corresponds to the third magnetic element 310b and the fourth magnetic element 320b, and is located under the third magnetic element 310b and the fourth magnetic element 320b. The first magnetic permeability element 350b has a first sidewall 351b and a first disposing part 352b. The first magnetic permeable element 350b is integrally formed, and the first sidewall 351b and the first disposing part 352b are fixedly connected. When viewed along the winding axis 345b of the coil 340b, the sum of the bottom areas of the third magnetic element 310b and the fourth magnetic element 320b is smaller than the bottom area of the first magnetic permeable element 350b. The first magnetic permeable element 350b encases the third magnetic element 310b and the fourth magnetic element 320b. In detail, the first sidewall 351b of the first magnetic permeable element 350b encases the surfaces of the third magnetic element 310b and the fourth magnetic element 320b facing away from the center of the carrier 130. The first disposing part 352b of the first magnetic permeable element 350b encases the surfaces of the third magnetic element 310b and the fourth magnetic element 320b facing away from the coil 340b. Therefore, the first disposing part 352b covers surfaces of the third magnetic element 310b and the fourth magnetic element 320b facing away from the coil 340b. Covering by the first disposing part 352b may block magnetic interference and avoid affecting the electromagnetic driving force generated between the third magnetic element 310b, the fourth magnetic element 320b, and the coil 340b.

The second magnetic permeable element 360b is disposed in the groove 132b of the carrier 130 (which is illustrated in FIG. 3), corresponding to the third magnetic element 310b and the fourth magnetic element 320b. The position of the second magnetic permeable element 360b corresponds to the third magnetic element 310b and the fourth magnetic element 320b, and is located above the third magnetic element 310b and the fourth magnetic element 320b. When viewed along the winding axis 345b of the coil 340b, the second magnetic permeable element 360b, the groove 132b, the coil 340b, and the third magnetic element 310b and the fourth magnetic element 320b are arranged sequentially (which is illustrated in FIG. 3). The second magnetic permeable element 360b may move relative to the first magnetic permeable element 350b. When viewed along the winding axis 345b (which is illustrated in FIG. 2) of the coil 340b, the area of the second magnetic permeable element 360b is smaller than the area of the first magnetic permeable element 350b. The length of the second magnetic permeable element 360b is smaller than the sum of the length of the third magnetic element 310b and the length of the fourth magnetic element 320b. The second magnetic permeable element 360b is arc-shaped, while in other embodiments, the second magnetic permeable element 360b may also have other shapes. The second magnetic permeable element 360b is attracted by the magnetic force of the third magnetic element 310b and the fourth magnetic element 320b and to the carrier 130 and the coil 340b. The attraction of the magnetic force makes the structure stable.

Figure 6:
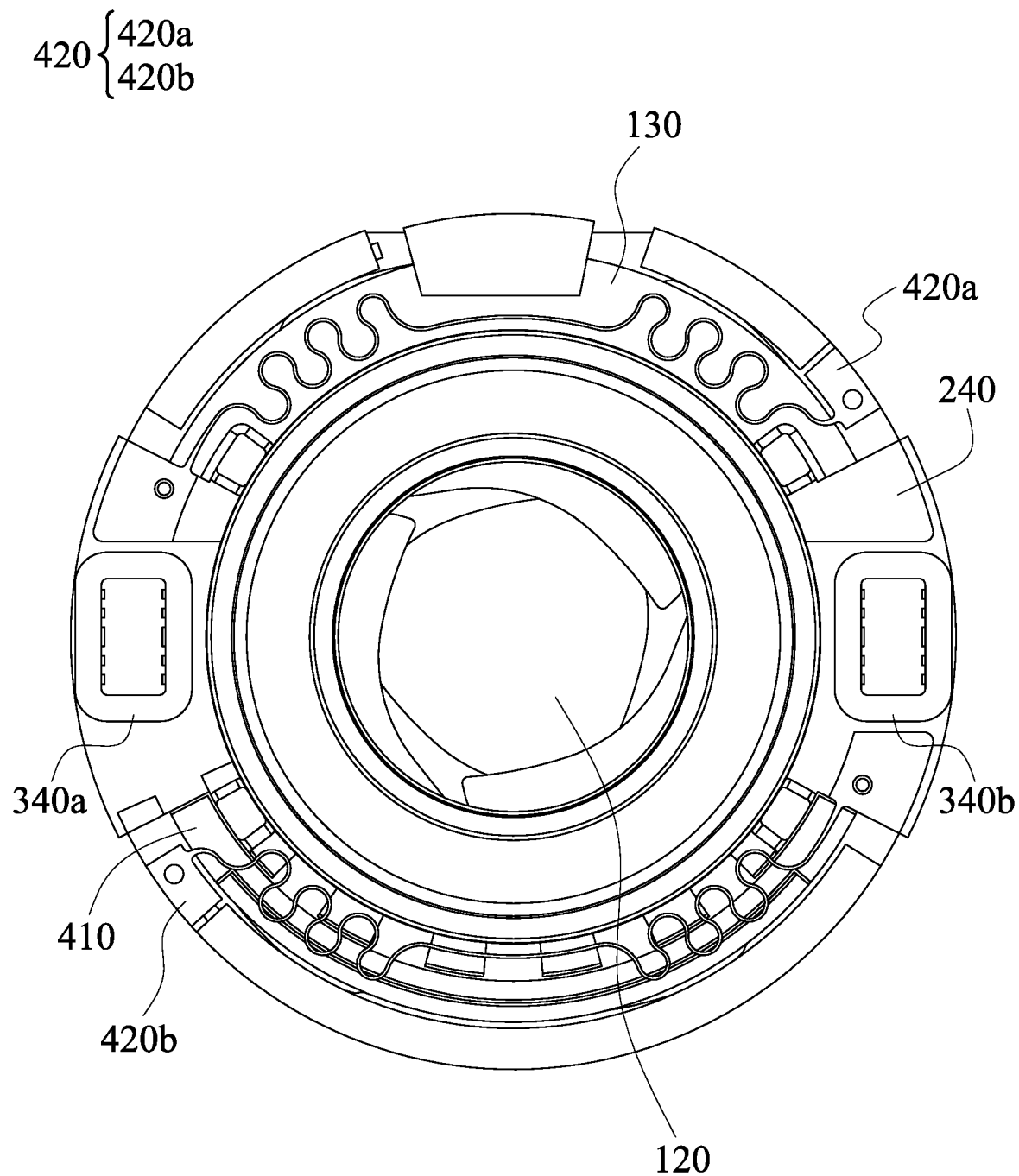
FIG. 6 is a cross-sectional view of the optical element driving mechanism of FIG. 1 along line A-A, according to certain aspects of the present disclosure.

Please refer to FIG. 2 again. The circuit assembly 400 includes a first circuit element 410, a second circuit element 420, and a third circuit element 430. Please refer to FIG. 6, which is a cross-sectional view of the optical element driving mechanism 1 along line A-A of FIG. 1, according to certain aspects of the present disclosure. The first circuit element 410 has a plate structure, and the first circuit element 410 is flexible, and may be made of materials such as copper and titanium.

The second circuit element 420 has a plate structure with a first part 420a and a second part 420b, and the second part 420b is similar with the first part 420a. The second circuit element 420 is made of stainless steel. One end of the first part 420a and the second part 420b of the second circuit element 420 are fixedly disposed on the carrier 130, and the other end is connected to the third circuit element 430.

The first circuit element 410 and the second circuit element 420 have different materials. The Young's modulus of the second circuit element 420 is greater than the Young's modulus of the first circuit element 410. When viewed along direction of the thickness of the second circuit element 420, the first circuit element 410 and the second circuit element 420 at least partially overlap each other. That is, when viewed along the direction of the plane of FIG. 6, the first circuit element 410 and the second circuit element 420 at least partially overlap.

The third circuit element 430 has a plate structure, and has a first electrical connecting part 432 and a second electrical connecting part 434 (which is illustrated in FIG. 2), the first electrical connecting part 432 and the first circuit element 410 are not parallel. The third circuit element 430 is located between the protection element 260 and the bottom 240.

The coil 340a of the driving assembly 300 is electrically connected to the coil 340b of the driving assembly 300 via the second circuit element 420, and is electrically connected to the third circuit element 430 via the first circuit element 410. Specifically, the first electrical connecting part 432 is connected to the first part 420a by means of solder. The first part 420a is connected to the coil 340a. The coil 340a is connected to the first circuit element 410. The first circuit element 410 is connected to the coil 340b. The coil 340b is connected to the second part 420b, and finally the second part 420b is connected to the second electrical connecting part 434, so that the coil 340a and the coil 340b is electrically connected via the first circuit element 410, the second circuit element 420, and the third circuit element 430.

Next, please refer to FIG. 2 again. The position sensing assembly 500 is disposed on the third circuit element 430, and includes a sensing element 510 and a sensing magnet 520. The protection element 260 has a strengthening part 262, and the strengthening part 262 has a protruding structure corresponding to the position sensing assembly 500. The position of the protruding structure of the reinforcing part 262 corresponds to the position sensing assembly 500 and is located under the position sensing assembly 500. The bottom area of the reinforcement part 262 is larger than the bottom area of the sensing element 510, which may protect the sensing element 510 and reduce the possible external impact on the sensing element 510.

To sum up, the present disclosure provides an optical element driving mechanism, which may save the internal space and achieve the purpose of miniaturization. At the same time, its structure can effectively absorb shocks, reduce magnetic interference, and stabilize by magnetic attraction, providing more stable and better optical quality.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

What is claimed is:

1. An optical element driving mechanism, comprising:
   a movable part connecting an optical element;
   a fixed part, wherein the movable part moves relative to the fixed part; and
   a driving assembly driving the movable part to move relative to the fixed part,
   wherein the driving assembly comprises:
   a first magnetic element;
   a second magnetic element;
   a coil, wherein a first section of the coil corresponds to the first magnetic element, and a second section of the coil corresponds to the second magnetic element;
   a first magnetic permeable element, corresponding to the first magnetic element; and
   a second magnetic permeable element, corresponding to the first magnetic element, wherein the second magnetic permeable element moves relative to the first magnetic permeable element.

2. The optical element driving mechanism as claimed in claim 1, wherein:
   the first magnetic element has a polygonal structure.

3. The optical element driving mechanism as claimed in claim 2, wherein when viewed along a winding axis of the coil, a first side of the first magnetic element is neither parallel nor perpendicular to the first section of the coil.

4. The optical element driving mechanism as claimed in claim 3, wherein when viewed along the winding axis of the coil, a second side of the first magnetic element is neither parallel nor perpendicular to the first section of the coil, and the first side is perpendicular to the second side.

5. The optical element driving mechanism as claimed in claim 1, wherein:
   the second magnetic element has a polygonal structure.

6. The optical element driving mechanism as claimed in claim 5, wherein when viewed along the winding axis of the coil, a third side of the second magnetic element is neither parallel nor perpendicular to the second section of the coil.

7. The optical element driving mechanism as claimed in claim 6, wherein when viewed along the winding axis of the coil, a fourth side of the second magnetic element is neither parallel nor perpendicular to the second section of the coil, and the third side is perpendicular to the fourth side.

8. The optical element driving mechanism as claimed in claim 5, wherein there is a gap between the first magnetic element and the second magnetic element, and the planes of any two sides of the gap are not parallel.

9. The optical element driving mechanism as claimed in claim 5, wherein the coil moves relative to the first magnetic element and the second magnetic element.

10. The optical element driving mechanism as claimed in claim 5, wherein the first magnetic permeable element has a first disposing part and a first sidewall.

11. The optical element driving mechanism as claimed in claim 10, wherein the first magnetic disposing part covers the first magnetic element.

12. The optical element driving mechanism as claimed in claim 5, wherein the first magnetic permeable element is integrally formed, encasing the first magnetic element and the second magnetic element.

13. The optical element driving mechanism as claimed in claim 5, wherein when viewed along the winding axis of the coil, the first magnetic element and the second magnetic element are smaller than the first magnetic permeable element.

14. The optical element driving mechanism as claimed in claim 5, wherein when viewed along the winding axis of the coil, the area of the second magnetic permeable element is smaller than the area of the first magnetic permeable element.

15. The optical element driving mechanism as claimed in claim 5, wherein the length of the second magnetic permeable element is smaller than the sum of the length of the first magnetic element and the second magnetic element.

16. The optical element driving mechanism as claimed in claim 5, wherein:

the movable part further comprises a groove; and the second magnetic permeable element is positioned within the groove of the movable part.

17. The optical element driving mechanism as claimed in claim 16, wherein when viewed along the winding axis of the coil, the second magnetic permeable element, the groove, the coil, and the first magnetic element and the second magnetic element are arranged sequentially, and the coil is positioned corresponding to the groove.

18. The optical element driving mechanism as claimed in claim 1, wherein the movable part comprises a plurality of supporting pillars positioned on both sides of the coil.

* * * * *